Figure 1:
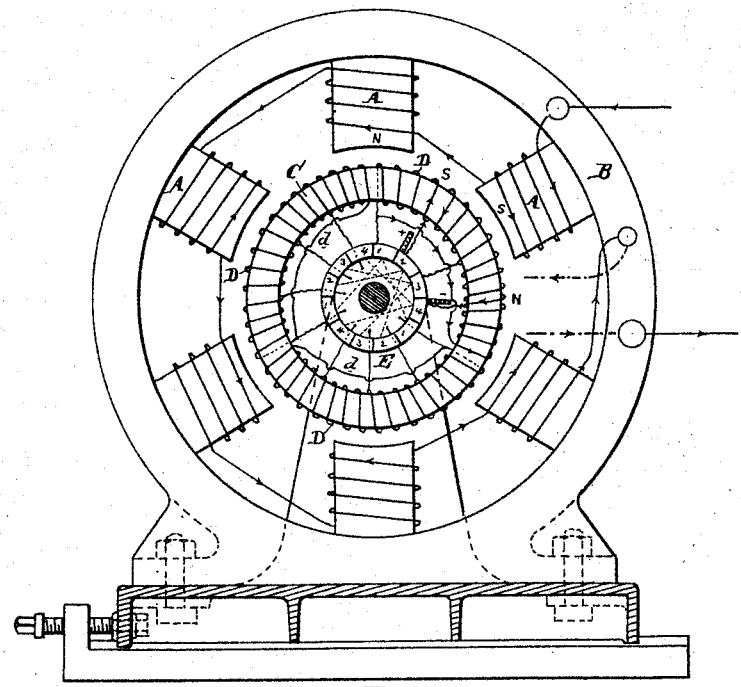

(No Model.) 2 Sheets—Sheet 1.

R. M. HUNTER.
DYNAMO ELECTRIC MACHINE AND MOTOR.

No. 492,888. Patented Mar. 7, 1893.

Attest  
Inventor (No Model.) 2 Sheets—Sheet 2.

R. M. HUNTER.
DYNAMO ELECTRIC MACHINE AND MOTOR.

No. 492,888. Patented Mar. 7, 1893.

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

DYNAMO-ELECTRIC MACHINE AND MOTOR.

SPECIFICATION forming part of Letters Patent No. 492,888, dated March 7, 1893.

Application filed October 29, 1892. Serial No. 450,330. (No model.)

*To all whom it may concern:*

Be it known that I, RUDOLPH M. HUNTER, of the city and county of Philadelphia and State of Pennsylvania, have invented an Improvement in Dynamo-Electric Machines and Motors, of which the following is a specification.

My invention has reference to dynamo electric machines and motors, and consists of certain improvements which are fully set forth in the following specification and shown in the accompanying drawings which form a part thereof.

This application, Case No. 233, has particular reference to the construction of dynamo electric machines for generating high potentials, and also machines adapted for use as electric motors upon high potential circuits.

In operating dynamo electric machines the potential or electro motive force is dependent upon the speed of the armature with respect to the fixed pole pieces of the field magnets, and also upon the size of the wire and number of turns upon the armature. The electro motive force is directly proportional to the speed, and where high electro motive forces are required the machines must be run at a very high speed with the construction heretofore employed. Where great potentials have been required it has been customary to couple two or more dynamo electric machines in series so that the electro motive forces of the several machines are added or combined. This construction, however, necessitates the use of several belts and pulleys and also requires the attention of the operator to the several independent machines. Furthermore, the danger of breakage or injury to the system is considerable as there are several independent moving parts, all of which require the most careful attention.

In carrying out my invention I so construct my machine that an armature revolves within a series of poles constituting the field magnet system, and is provided with two or more independent windings, preferably upon the same core. The several independent windings are connected in a suitable manner with the commutator sections of suitable commutating devices whereby poles in the armature may be maintained intermediate of the poles of the field magnets as is customary in all dynamo electric machines or motors. The circuits of the several armature windings are so connected that they are in series with each other so that the impressed electro motive force of the machine on the line, equals the combined electro motive forces of the several armature windings.

My improvement may be carried out in various ways, one only of which is illustrated in the accompanying drawings. The several windings of my improved armature are equivalent to a Gramme ring split at one place and opened out to a curve corresponding to a larger diameter, and several of the said sections are united end to end to form one complete ring, having several independent closed windings. By means of suitable commutators and brushes the current received from one armature winding is caused to flow through the next, and the resulting electro motive force of the second winding combined with that of the first is caused to pass through the third winding, and so on. The construction is in effect one in which with a common field magnet system we have the equivalent of a series of armatures, rotating in succession in front of the said field magnet poles.

Figure 2:
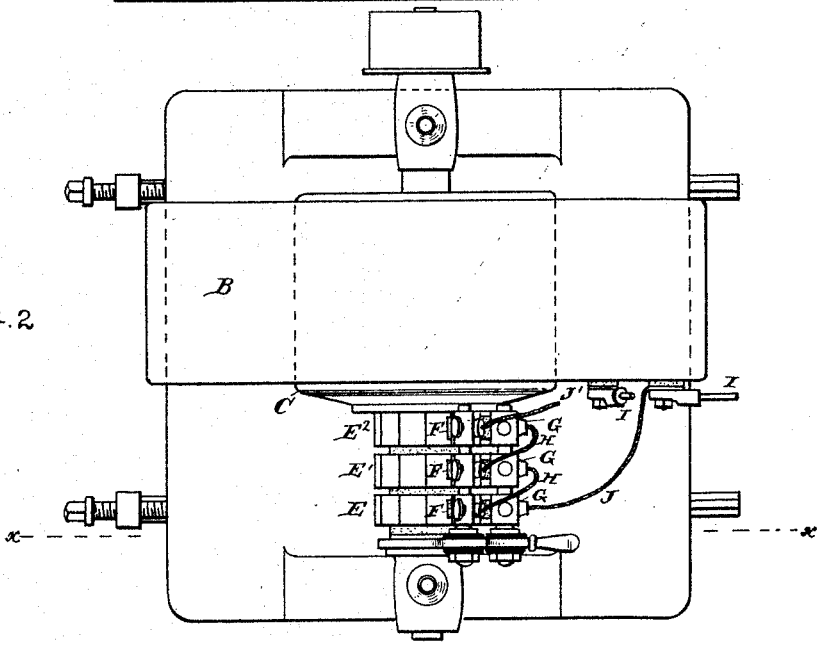
Figure 3:
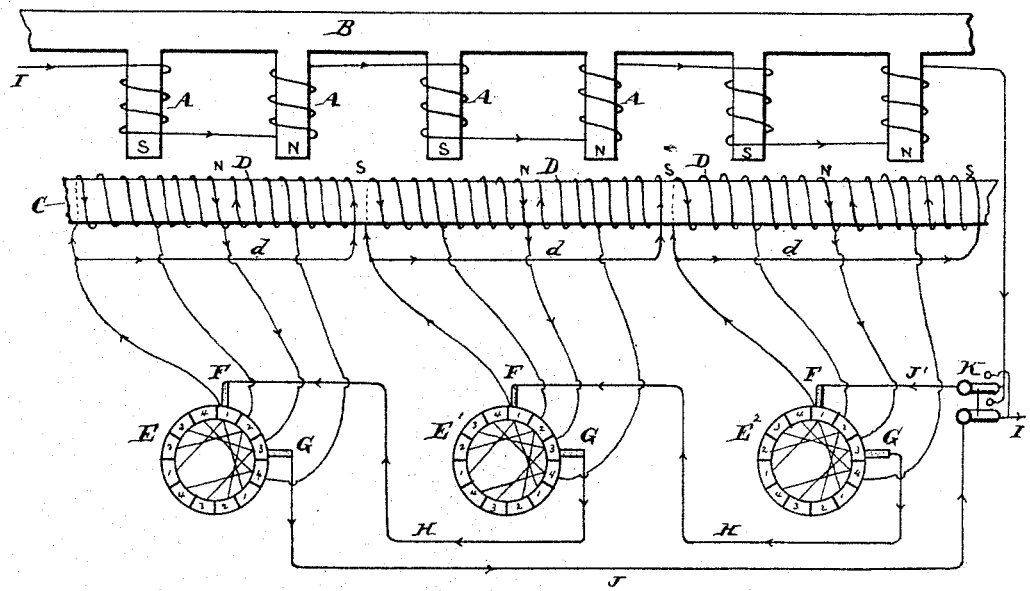

Referring to the drawings: Figure 1 is a sectional elevation of a dynamo electric machine or motor embodying my invention taken on line $x$—$x$ of Fig. 2. Fig. 2 is a plan view of same; and Fig. 3 is a diagram illustrating the various circuits.

A are the field magnets and are preferably six or more in number and project inwardly from a yoke piece B very similar to the well known types of alternating generators or multipolar generators for railway work.

C is the armature and may be formed similar to any Gramme ring armature. It consists of a core wound with several coils D. The armature as shown is provided with three independent coils having no direct connection with each other except through the commutators, their brushes and external circuits as more clearly shown in Fig. 3. The beginning and end of each set of coils D are united by a wire $d$. The coils at different distances in their length are connected by suitable conductors with the commutators E, E', E².

As shown, each one of the windings D is connected at four places with four sections of its commutator, and the commutator is further divided and coupled in the manner indicated so that all the sections 1 connect with the same place on the winding D, all the sections 2 connect with the same place on the coils D, and so on. Each of the commutators is provided with a positive brush F and a negative brush G which are connected in series with the other brushes by circuits H as indicated in Fig. 3.

One terminal of the coils of the field magnets connects with the line circuit I, and the other terminal connects with the brush F of the commutator $E^2$ by a circuit J', whereas the other line I connects with the brush G by a circuit J. The direction of the current is indicated by the arrows.

A reversing switch K may be employed to control the current passing through the armature, so that when the machine is run as a motor it is reversible. The winding and circuits on the field and armature are such that the poles are arranged alternately, that is to say, the field magnet poles are arranged alternately south and north while the armature poles are similarly arranged between the field magnet poles. The letters S and N in Figs. 1 and 3 indicate the poles of north and south polarity.

It will be seen that upon rotating the armature in front of the pole piece of the field magnets the several closed windings D will constitute three distinct armatures permanently connected together within the machine structure, and through which the current is caused to flow in succession, thus adding the electro motive forces of the several windings.

It is immaterial to my invention what the particular details of construction may be, so long as the coils are caused to move before pole pieces in such a manner that the current may flow in a continuous course through the successive coils irrespective of their rotation within the poles.

While I have shown the winding of the machine as a constitute series machine or one in which the armature is in series with the field, it is quite evident that the field magnets may be in shunt relation with respect to the armature if so desired as is customary in shunt wound or compound machines.

The details of construction may be modified without departing from the principles of the invention.

What I claim as new, and desire to secure by Letters Patent, is—

1. In a dynamo electric machine or motor, the combination of a field magnet structure having a series of pole pieces, combined with a rotating armature provided with a series of independent windings constituting closed circuits, and commutating devices for connecting the several windings of the armature in permanent series connection so that the current generated in one set of coils is caused to flow through the other coils in succession.

2. In a dynamo electric machine or motor, the combination of a field magnet structure having a series of pole pieces, combined with a rotating armature provided with a series of independent windings constituting closed circuits, commutating devices for connecting the several windings of the armature in permanent series connection so that the current generated in one set of coils is caused to flow through the other coils in succession, and electric circuits connecting the windings of the pole pieces in series with the armature.

3. In a dynamo electric machine or motor, the combination of a field magnet structure having a series of pole pieces, combined with a rotating armature provided with a series of independent windings constituting closed circuits, commutating devices for connecting the several windings of the armature in permanent series connection so that the current generated in one set of coils is caused to flow through the other coils in succession, electric circuits connecting the winding of the pole pieces in series with the armature independently of the field coils.

4. In a dynamo electric machine or motor, the combination of a field magnet structure having a series of poles, with a rotating armature consisting of a core provided with a series of independent coils arranged upon said core in succession and forming closed circuits, a separate commutator connecting with each of the coils similarly to a Gramme ring, and brushes and connecting circuits for connecting the several windings in series with each other through the commutators.

5. In a dynamo electric machine or motor, the combination of a field magnet structure having a series of poles, with a rotating armature consisting of a core provided with a series of independent coils arranged upon said core in succession and forming closed circuits, a separate commutator connecting with each of the coils similarly to a Gramme ring, brushes and connecting circuits for connecting the several windings in series with each other through the commutators, coils upon the field magnet poles, and a switch to reverse the current in the armature coils independent of the field magnet coils.

6. In a dynamo electric machine or motor, the combination of a series of pole pieces of alternate polarity arranged in a circle, a rotating armature having independent closed wire coils connected to separate commutators arranged upon the same side of the armature, a series of brushes for said commutators, and connecting circuits for coupling the brushes of the several commutators in series.

7. A Gramme ring for a dynamo electric machine or motor consisting of a core having two or more sets of coils wound upon it and each closed upon itself, a separate commutating device for each set of coils consisting of a commutator having its sections connecting with several places upon the independent coils, and brushes for the several commutators connected in series.

8. In a Gramme ring for a dynamo electric machine or motor, the combination of a core, with a series of independent coils wound upon the core and arranged end to end and forming separate closed circuits, and commutating devices carried with the armature for the several coils and so arranged as to produce therein poles of opposite polarity at stated intervals about the core.

In testimony of which invention I have hereunto set my hand.

R. M. HUNTER.

Witnesses:
ERNEST HOWARD HUNTER,
O. M. DIETTERICH.